(12) United States Patent
Theuerkorn

(10) Patent No.: US 8,267,596 B2
(45) Date of Patent: Sep. 18, 2012

(54) FIBER OPTIC CABLE ASSEMBLIES WITH FIBER ACCESS APERTURES AND METHODS OF ASSEMBLY

(75) Inventor: Thomas Theuerkorn, Hickory, NC (US)

(73) Assignee: Corning Cable Systems LLC, Hickory, NC (US)

(*) Notice: Subject to any disclaimer, the term of this patent is extended or adjusted under 35 U.S.C. 154(b) by 0 days.

(21) Appl. No.: 12/861,489

(22) Filed: Aug. 23, 2010

(65) Prior Publication Data

US 2012/0045179 A1  Feb. 23, 2012

(51) Int. Cl.
*G02B 6/36* (2006.01)

(52) U.S. Cl. ............... 385/81; 385/53; 385/54; 385/56; 385/62; 385/69; 385/70; 385/86; 385/87; 385/114

(58) Field of Classification Search .............. 385/53–94, 385/114
See application file for complete search history.

(56) References Cited

U.S. PATENT DOCUMENTS

| | | | |
|---|---|---|---|
| 4,273,412 A | 6/1981 | Hillegonds | 350/96.2 |
| 5,748,819 A | 5/1998 | Szentesi et al. | 385/60 |
| 2001/0019654 A1* | 9/2001 | Waldron et al. | 385/134 |
| 2003/0128938 A1* | 7/2003 | Caveney | 385/81 |
| 2004/0047566 A1* | 3/2004 | McDonald et al. | 385/78 |
| 2004/0156593 A1* | 8/2004 | Ngo et al. | 385/87 |
| 2006/0269194 A1 | 11/2006 | Luther et al. | 385/78 |
| 2007/0172175 A1 | 7/2007 | Imanbayev et al. | 385/78 |
| 2009/0175580 A1* | 7/2009 | Chen et al. | 385/75 |

OTHER PUBLICATIONS

Patent Cooperation Treaty Form ISA/220, Dec. 15, 2011, p. 3.

* cited by examiner

*Primary Examiner* — Brian M. Healy
*Assistant Examiner* — Guy Anderson
(74) *Attorney, Agent, or Firm* — Christopher Paul Lewallen

(57) ABSTRACT

A fiber optic connector assembly includes a fiber optic cable with one or more optical fiber ribbons attached to a fiber optic connector. The connector includes a ferrule assembly and a crimp body with a fiber access aperture. The aperture has at least two walls defining a first width and a second width defining a predetermined delta and a predetermined aspect ratio. The delta and aspect ratio provide optical fiber access for alignment of the optical fiber ribbon to the optical fiber ferrule assembly. A method of making the fiber optic connector assembly is also disclosed.

33 Claims, 15 Drawing Sheets

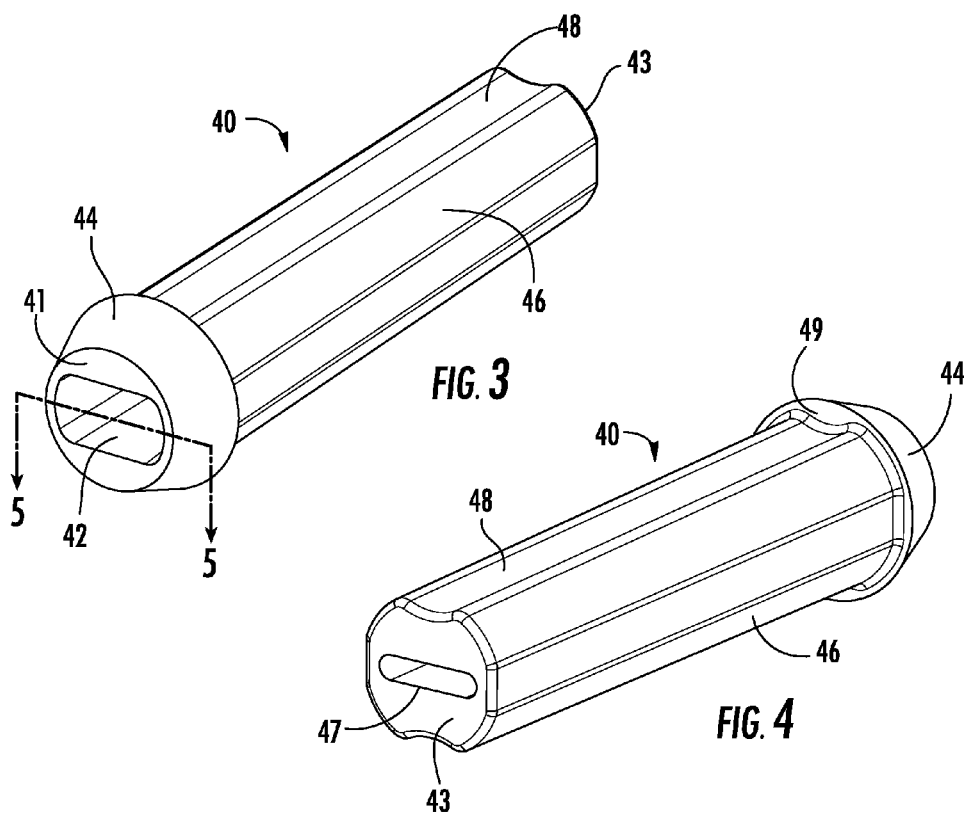
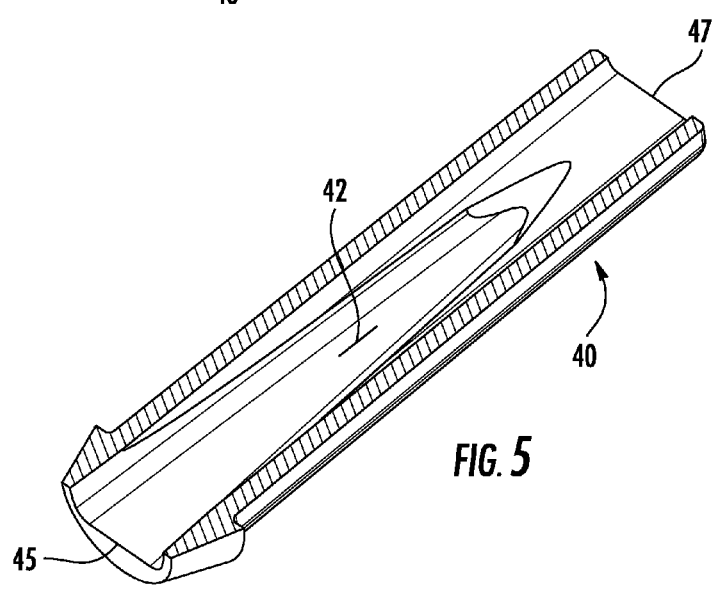

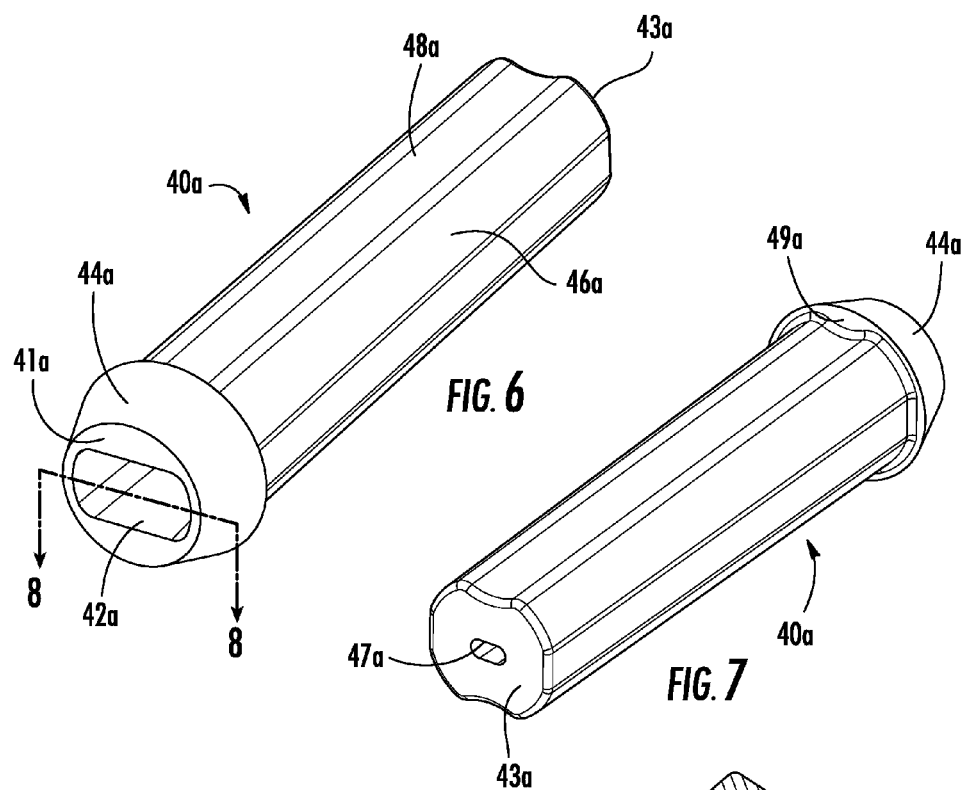
FIG. 6
FIG. 7
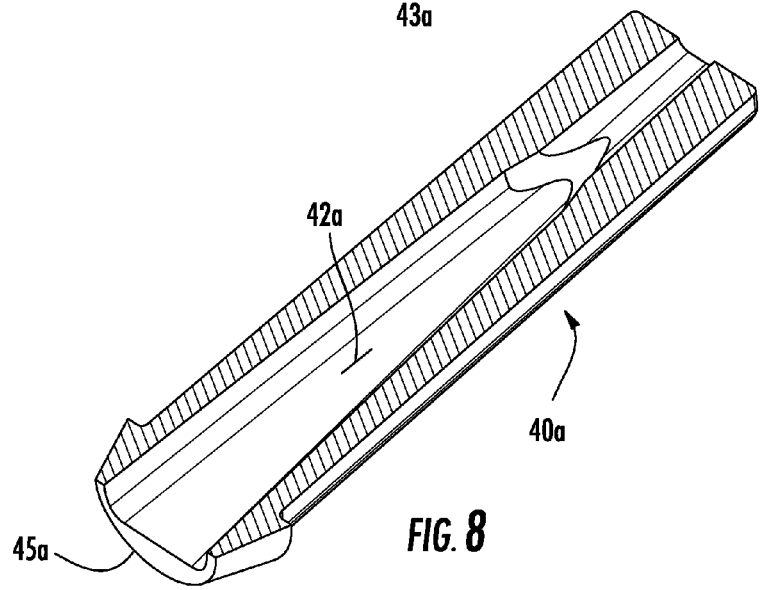
FIG. 8

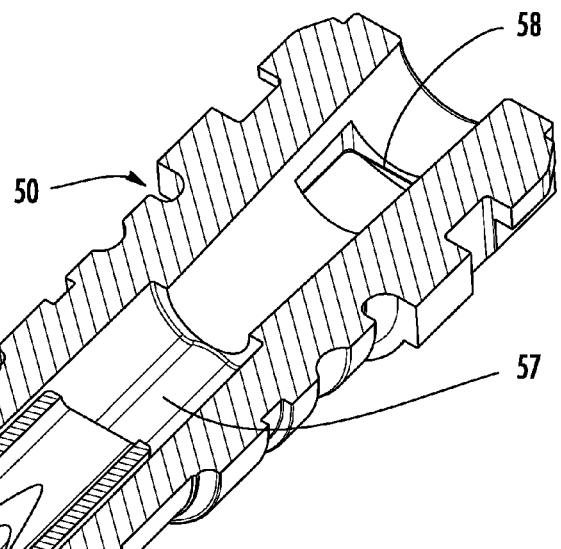
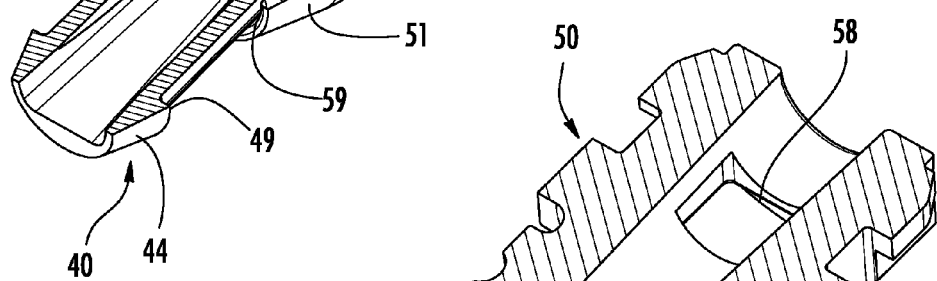
FIG. 10
FIG. 11

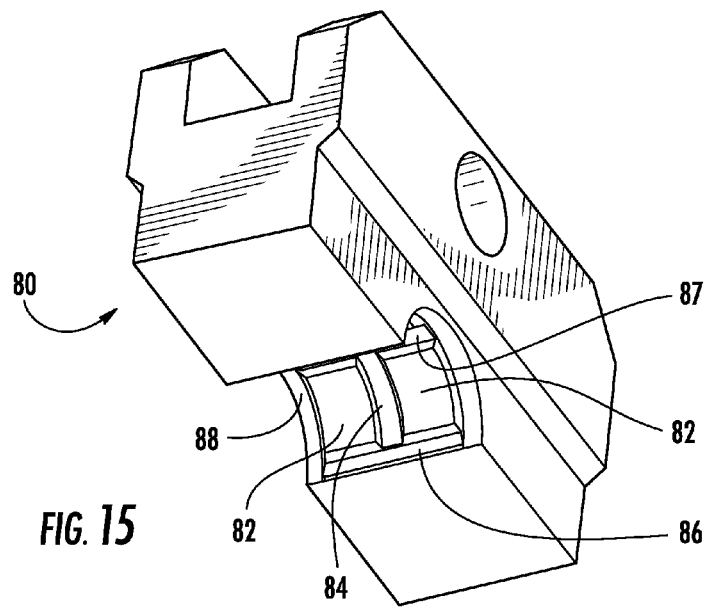
FIG. 15
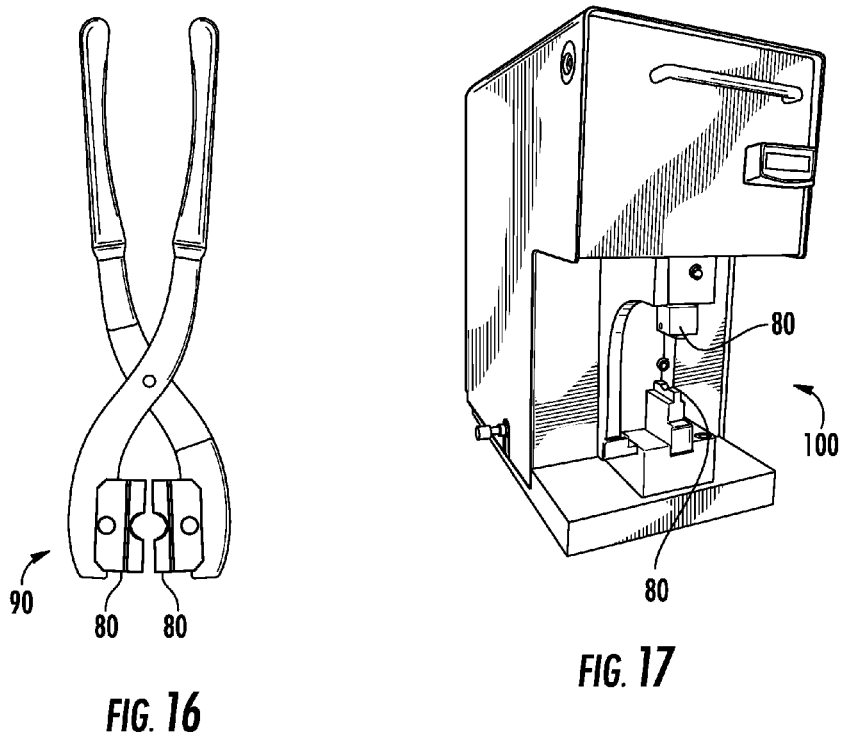
FIG. 16
FIG. 17

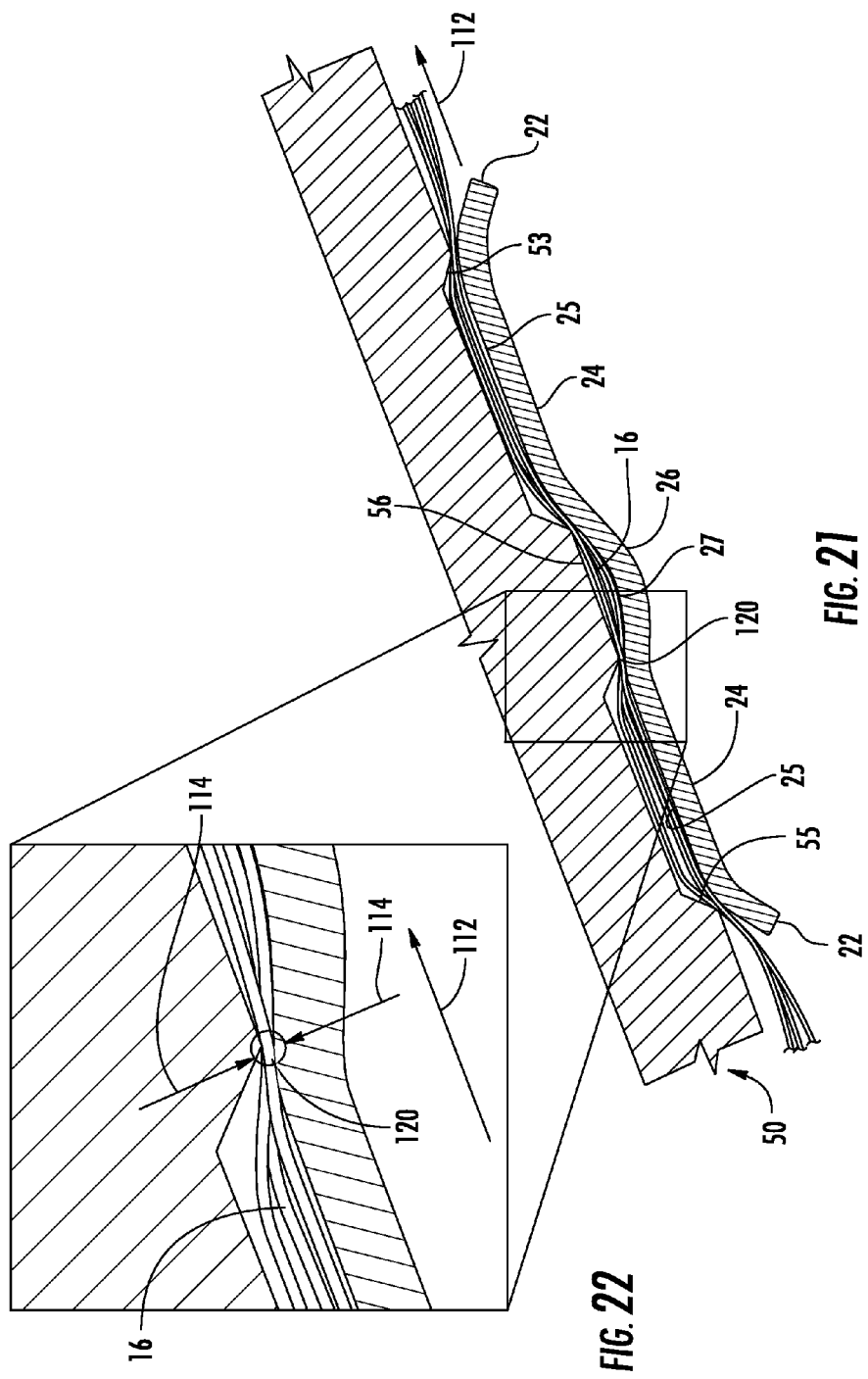

FIBER OPTIC CABLE ASSEMBLIES WITH FIBER ACCESS APERTURES AND METHODS OF ASSEMBLY

BACKGROUND OF THE INVENTION

1. Field of the Invention

An fiber optic connector is disclosed, and more particularly, fiber optic assemblies defined by attaching a fiber optic cable to a housing is disclosed.

2. Technical Background

Optical fiber connectors have acquired an increasingly important role in the field of telecommunications, frequently replacing existing copper connectors. This trend has had a significant impact in all areas of telecommunications, greatly increasing the amount of data that is transmitted. Further increase in the use of optical fiber connectors is foreseen, especially in metro and fiber-to-the-home applications, as local fiber networks are pushed to deliver an ever-increasing volume of audio, video, and data signals to residential and commercial customers. In addition, use of fiber in home and commercial premise networks for internal data, audio, and video communications has begun, and is expected to increase.

Optical fiber cable assemblies require the optical fibers to be aligned in the optical fiber connectors. Alignment issues can create optical attenuation and signal strength may be significantly degraded where misalignment exists. Moreover, the cable must be firmly attached to the connector. If the cable is pulled off the connectors, the optical fibers will break and the cable assembly will be destroyed. The alignment and cable attachment features of conventional cable assemblies sufficient protection against attenuation losses and do not provide sufficient resistance to cable pull off forces.

SUMMARY

A fiber optic connector assembly includes a fiber optic cable, having at least one optical fiber ribbon and a fiber optic connector. The fiber optic connector includes at least one optical fiber ferrule assembly, a crimp body, the crimp body defining a through passage, and a fiber access aperture having at least two walls defining a first width and a second width, wherein the fiber access aperture defines a predetermined delta and a predetermined aspect ratio providing optical fiber ribbon access for alignment of the optical fiber ribbon to the optical fiber ferrule assembly; and a crimp band for holding a fiber optic cable to the fiber optic connector.

A method of assembling a fiber optic cable assembly involves attaching a fiber optic cable having at least one optical fiber to a fiber optic connector, the connector including a crimp body having a fiber access aperture. The at least one optical fiber is inserted into the crimp body, and the fiber may be observed and manipulated through the fiber access aperture.

Additional features are set forth in the detailed description which follows, and in part will be readily apparent to those skilled in the art from that description or recognized by practicing the described embodiments and the claims, as well as the appended drawings.

It is to be understood that both the general description and the detailed description are exemplary, and are intended to provide an overview or framework to understand the claims. The accompanying drawings are included to provide a further understanding, and are incorporated in and constitute a part of this specification. The drawings illustrate one or more embodiment(s), and together with the description serve to explain principles and operation of the embodiments.

BRIEF DESCRIPTION OF THE DRAWINGS

FIGS. 3-5 show an optical fiber guide for the connector sub-assembly of FIG. 1;

FIGS. 6-8 show another optical fiber guide insert for the connector sub-assembly of FIG. 1;

FIG. 10 is a cross sectional perspective view of the insert of FIG. 5 partially inserted into the crimp body of FIG. 9;

FIG. 11 is a cross sectional perspective view of the insert of FIG. 5 fully seated into the crimp body of FIG. 9;

FIG. 15 is a perspective view of a crimp die for forming a crimp band;

FIG. 16 a side view of a manual crimping tool having a pair of the crimp die of FIG. 15 attached;

FIG. 17 is a power crimping tool having a pair of the crimp die of FIG. 15 attached;

FIG. 21 is a partial cross sectional detail of an interface of the connector sub-assembly of FIG. 18, highlighting the relationship of features of the crimp body and the crimp band;

FIG. 22 is a close-up detail of the cross sectional view of FIG. 21, highlighting a high compression point;

DETAILED DESCRIPTION

A crimp body is disclosed that cooperates with a crimp band for increased strength. The crimp body may be included in a fiber optic connector assembly, a fiber optic cable assembly, a splice assembly, or a furcation assembly. The crimp body has features that interlock with features on the crimp band to crimp a cable having fibrous strength elements to a suitable sub-assembly. The crimp body further may include an access aperture for optical fiber handling during assembly of the fiber optic cable assembly.

Figure 1:
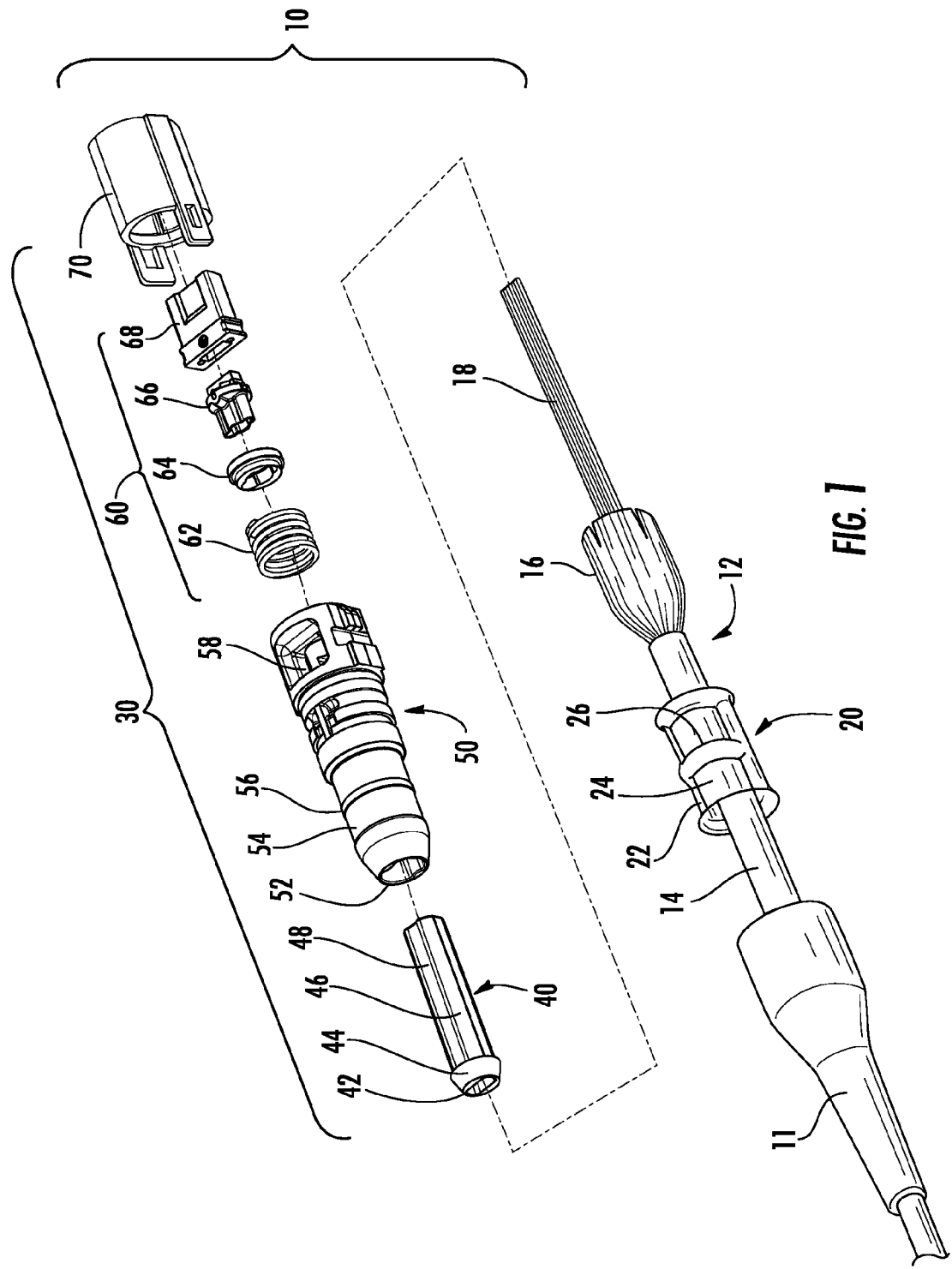
FIG. 1 is an exploded view of a connector sub-assembly.

In an exemplary embodiment, a fiber optic cable sub-assembly 10 includes at least a boot 11, a fiber optic cable 12, a crimp band 20 and a connector sub-assembly 30 (FIG. 1). Connector sub-assembly 30 includes at least an optical fiber guide insert 40, a crimp body 50, a fiber optic ferrule assembly 60 and an inner housing 70. Ferrule assembly 60 may include a round spring 62, a spring centering cuff 64, a ferrule boot 66 and a multi-fiber ferrule 68. Ferrule assembly 60 may be secured to an end of crimp body 50 by inner housing 70.

Boot 11 may be adapted, for example, to translate axially about cable 12 and provides strain relief to cable sub-assembly 10. Boot 11 may be, for example, a pre-molded boot that may be secured to cable 12 and connector sub-assembly 30 using an adhesive. Alternatively, boot 11 may be an over-molded boot that may be applied to cable 12 and connector sub-assembly 30 using an over-molding process. In exemplary embodiments, boot 11 may be a heat-shrinkable boot made from, for example, a polyolefin.

Cable 12 may include, for example, a round cable jacket 14, but may alternately include a square, rectangular, oval or dog-bone shaped cable jacket. Cable 12 may include, for example, 12 loose optical fibers having at least a portion of the fibers converted into, for example, a ribbon 18. As an alternative, cable 12 may include optical fiber ribbon. Cable 12 has a fibrous strength element 16 that may be selected from the group consisting of fiberglass, aramid fibers or yarns, steel mesh and carbon fibers. In exemplary embodiments, strength element 16 includes 2000-3000 decitex fiberglass fibers.

Figure 2:
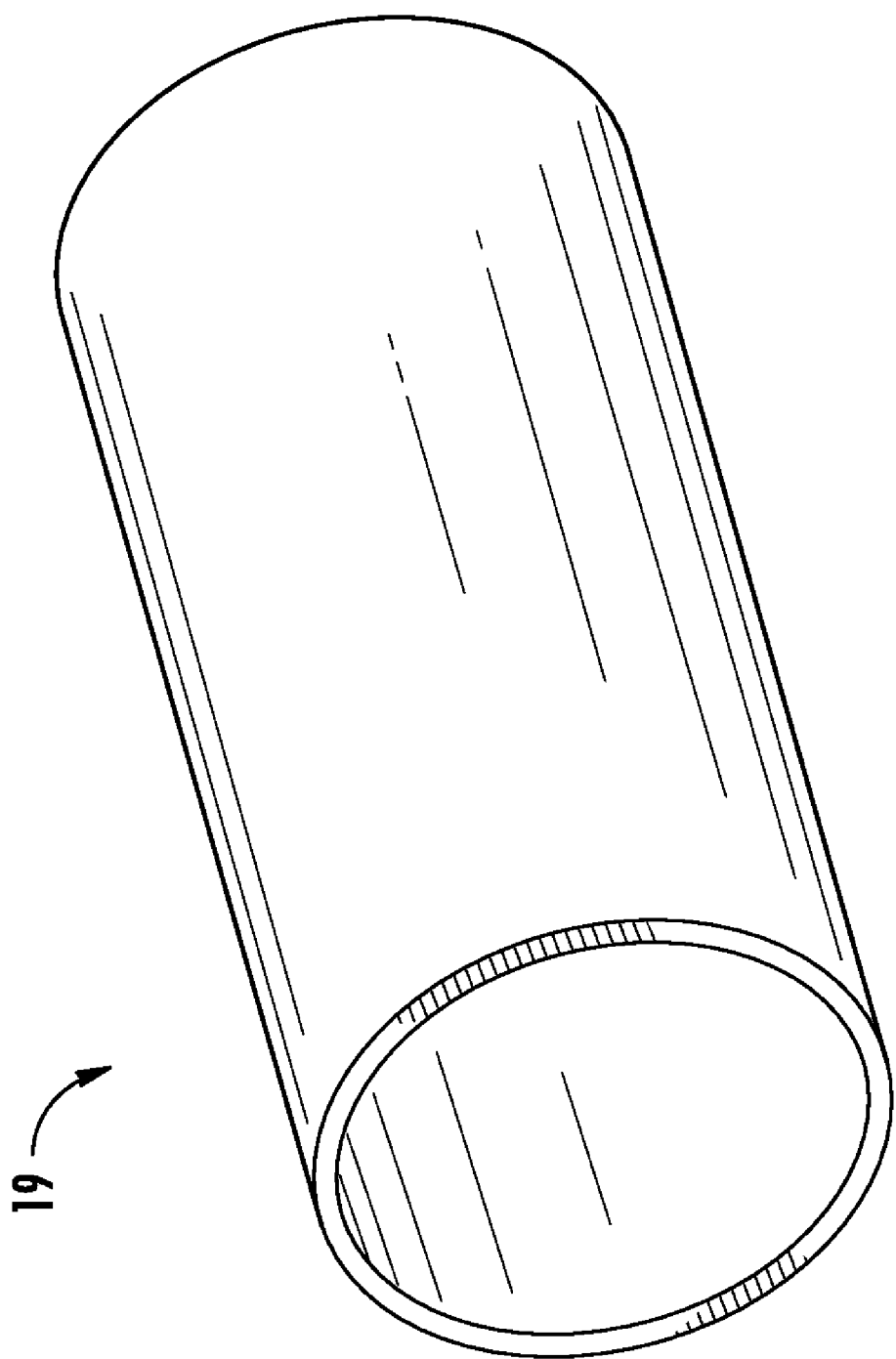
FIG. 2 is a perspective view of a sleeve for making a crimp band.

Crimp band 20 may include, for example, a flare 22, an indentation 24 and a rib 26. Crimp band 20 may be formed, for example, from a sleeve 19 (FIG. 2). Sleeve 19 may be generally tubular having a length and a width and a wall thickness. The wall thickness may be from about 0.25 millimeter (mm) to about 0.75 mm, and in an exemplary embodiment the wall thickness may be about 0.35 mm. Sleeve 19 has a length from about 8.5 mm to about 9.5 mm, and in an exemplary embodiment has a length of about 9.0 mm. Sleeve 19 has an external width, or diameter, from about 8.2 mm to about 9.2 mm. Sleeve 19 may be made from a malleable metal alloy selected from the group consisting of brass, bronze, steel, lead, copper, aluminum, tin, zinc, iron, and nickel, though other malleable materials are possible.

Insert 40 (FIGS. 1 and 3-5) may be inserted into crimp body 50 and may be adapted to receive at least one optical fiber and may receive ribbon 18, for example, having 12 fibers. Alternate embodiments of insert 40 may include, for example, insert 40*a* (FIGS. 6-8) adapted to receive at least one optical fiber and may receive a ribbon having four optical fibers. Wherever possible, the disclosure will refer to elements common to both insert 40 and insert 40*a* together for clarity.

Insert 40, 40*a* may include, for example, a first end 41, 41*a*, a through passage 42, 42*a*, a second end 43, 43*a*, a transition surface 44, 44*a*, a fiber entrance 45, 45*a*, at least one contact surface 46, 46*a*, a fiber exit 47, 47*a*, at least one alignment slot 48, 48*a*, and an abutment surface 49, 49*a*. Through passage 42, 42*a* passes from entrance 45, 45*a* on first end 41, 41*a* to exit 47, 47*a* on second end 43, 43*a*. Through passage 42, 42*a* has a first height and first width at entrance 45, 45*a* and a second height and a second width at exit 47, 47*a*. The height of through passage 42 may change from about 1.9 mm to about 0.7 mm, and the heights of through passage 47*a* may change from about 1.9 mm to about 0.6 mm. The widths of through passage 47 may change from about 3.5 mm to about 3.1 mm, and the widths of through passage 47*a* may change from about 3.5 mm to about 1.1 mm.

Surface 44, 44*a* may be adjacent to the first end 41, 41*a*, and may be a substantially tapered, or frustoconical, surface. Abutment surface 49, 49*a* may be adjacent to the surface 44, 44*a*, opposite first end 41, 41*a*. Surface 49, 49*a* may include an insertion stop. The at least one alignment slot 48, 48*a*, for rotationally aligning inserts 40, 40*a* within crimp body 50, extends longitudinally along the exterior of inserts 40, 40*a*, substantially from surface 49, 49*a* to second end 43, 43*a*. In exemplary embodiments insert 40, 40*a* may include two alignment slots 48, 48*a*.

The at least one contact surface 46, 46*a* may extend longitudinally along the exterior of inserts 40, 40*a*, substantially from surface 49, 49*a* to second end 43, 43*a*. In exemplary embodiments, insert 40, 40*a* may include two surfaces 46, 46*a*. In further exemplary embodiments, insert 40, 40*a* may include four surfaces 46, 46*a*. The at least one surface 46, 46*a* may include a taper to facilitate, for example, a friction fit. Insert 40, 40*a* may include a thermoplastic elastomer with Shore D hardness from about 70 to about 90. Exemplary embodiments may include Hytrel®, available from DuPont™, a thermoplastic elastomer with Shore D hardness of about 82. However, other suitable elastomeric polymers may be used.

Figure 9:
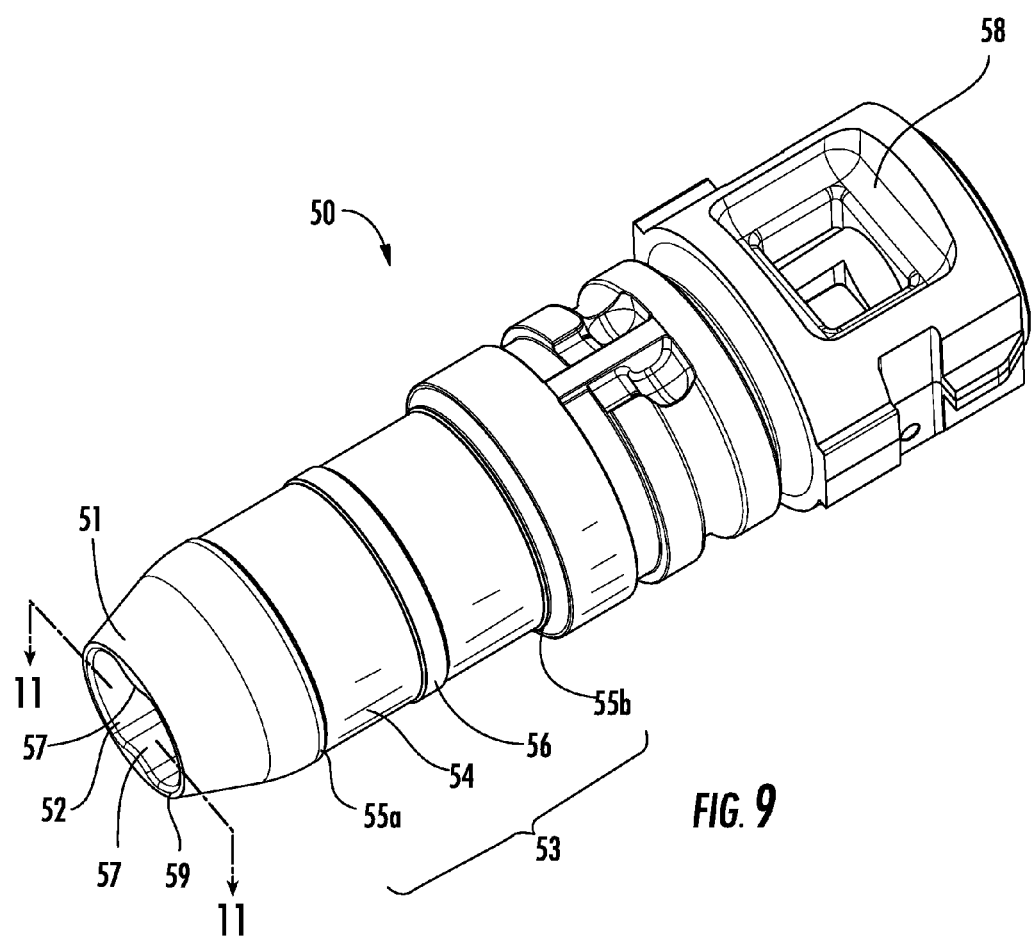
FIG. 9 is a perspective view of an exemplary crimp body for attaching to a fiber optic cable having fibrous strength elements.

Crimp body 50 (FIG. 9) may include, for example, a transition surface 51, an insert receiving area 52, and a crimp zone 53. Zone 53 may include at least one compression area 54, a rearward step 55*a*, a forward step 55*b* and at least one hoop 56. Crimp body 50 may further include at least one alignment key 57 located within receiving area 52, an abutment surface 59 and a fiber access aperture 58.

Crimp body 50 may be adapted to, for example, mechanically interlock to crimp band 20 for securing cable 12 on an end, and may be further adapted to receive the inner housing 70 (see FIG. 1) to an opposite end. Receiving area 52 may be adapted to receive insert 40, 40*a*. At least a portion of receiving area 52 may include a tapered interior surface that cooperates with surface 46, 46*a* of insert 40, 40*a*. The at least one alignment key 57 may associate with the at least one alignment slot 48, 48*a* found on insert 40, 40*a*. The at least one alignment key 57 may be configured to interfere with the at least one alignment slot 48, 48*a* to cause a tight interference fit between insert 40, 40*a* and crimp body 50. Surface 59 may be located adjacent to surface 51. When inserts 40, 40*a* are inserted into crimp body 50, surface 49 may substantially abut surface 59, stopping any further insertion. The surface 44, 44*a* found on inserts 40, 40*a* conforms to surface 51, creating a substantially contiguous transition surface for easing strength elements 16 from cable 12 onto crimp zone 53 (see FIGS. 10 and 11).

Compression area 54 may receive a compressive force from crimp band 20. In an exemplary embodiment, the at least one hoop 52 may be located between at least a pair of compression areas 54. In yet other exemplary embodiments, multiple hoops 52 may be located among multiple compression areas 54. The at least one hoop 52 can have an external width, or diameter, which may be greater than the external width of the compression areas 54. The external width of the hoop 52 may be, for example, about 7.90 mm. The external width of the compression areas 54 may be, for example, about 7.70 mm. Hoop 52 may include slanted side walls at an angle of about 135 degrees relative to a longitudinal axis of the crimp body 50. Rearward step 53 and forward step 55 may also have slanted side walls at an angle of about 135 degrees and may have a width of about 7.90 mm.

Figure 23:
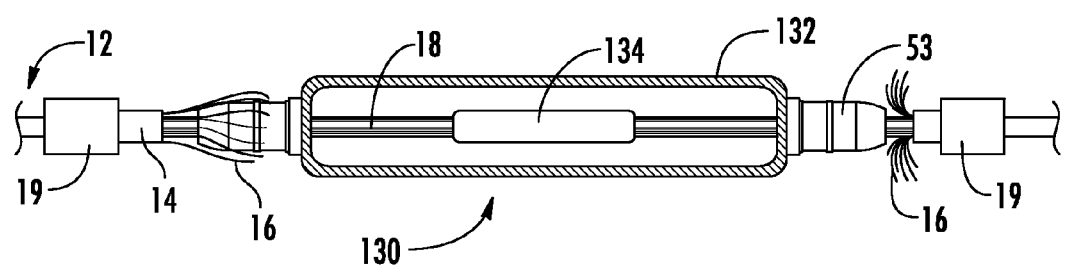
FIG. 23 is an exemplary splice assembly for attaching to a fiber optic cable having fibrous strength elements.
Figure 24:
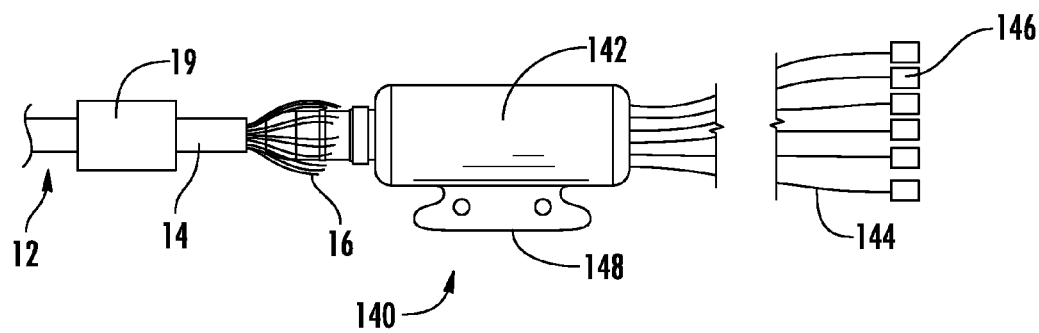
FIG. 24 is an exemplary furcation assembly for attaching to a fiber optic cable having fibrous strength elements.

In other exemplary embodiments, bodies or housings having crimp zone 53 may include, for example, splice assemblies 130 (FIG. 23) and cable furcations 140 (FIG. 24). Splice assembly 130 includes a splice housing 132 having one or more crimp zones 53 for securing strength element 16 of cable 12, using sleeve 19 for forming crimp band 20. Other cables having fibrous strength elements may be suitable. Splice assembly 130 may be used, for example, to repair a severed cable to substantially the rated yield strength of the previously unsevered cable. Cable furcation 140 may include a furcation housing 142 having at least one crimp zone 53 for securing strength element 16. Cable furcation 140 may be attached to, for example, a wall, shelf, pole, etc., using an attachment ear 148. Alternately, cable furcation 140 may be attached using, for example, a clamp or a bar.

Figure 9A:
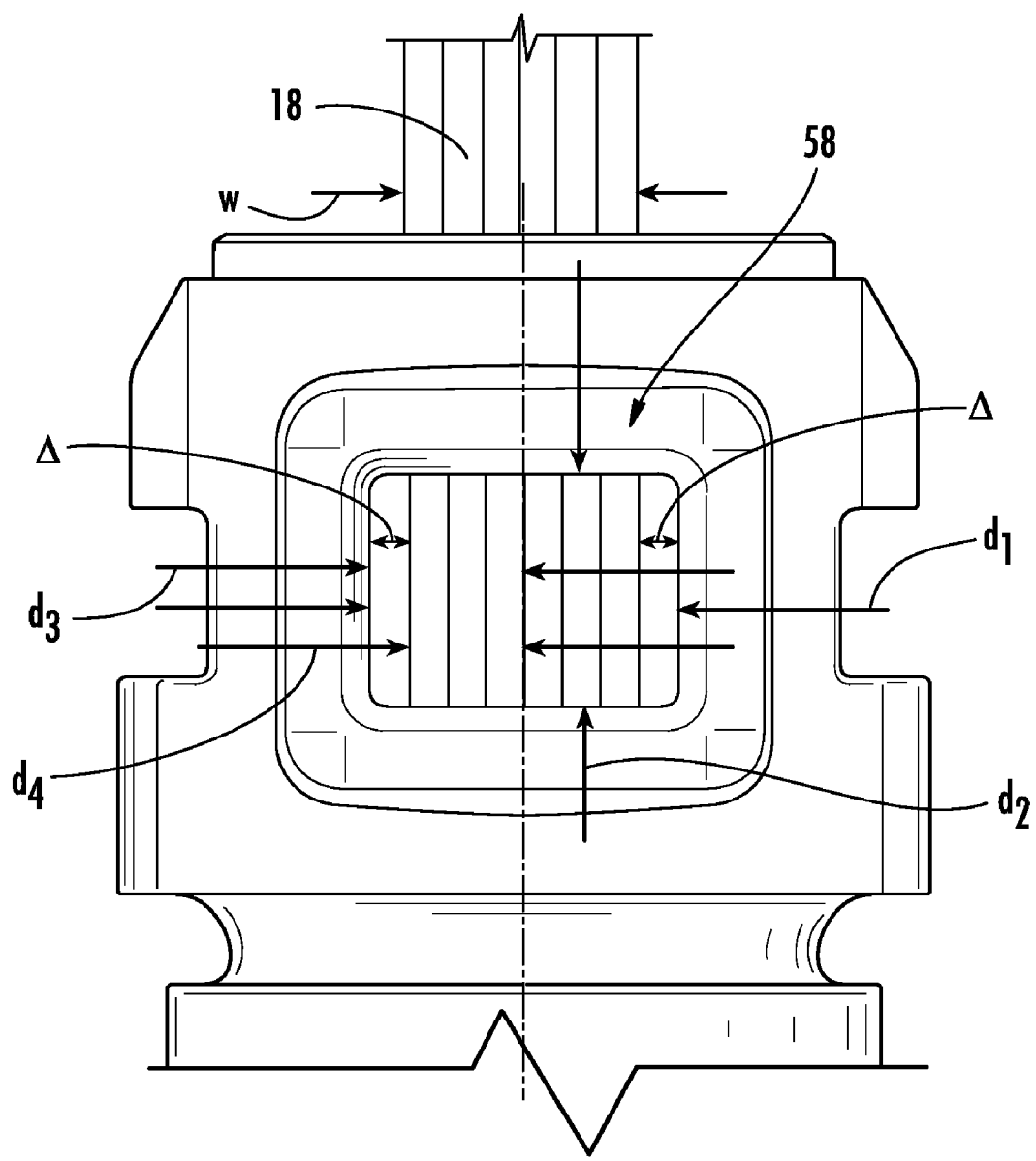
FIG. 9A is a detail view of the crimp body of FIG. 9.

Access aperture 58 (FIG. 9A) can be a substantially lateral passageway through crimp body 50, near an end, for example, opposite crimp zone 53. Access aperture 58 may include a first width, d1, and a second width, d2. Access aperture 58 includes an aspect ratio (AR), defined as the ratio between the first width and the second width, and quantitatively defined as d1:d2 (d1 divided by d2), thus d1:d2=AR. The AR ratio may be from about 0.5 to about 1.4. In exemplary embodiments, the AR is about 1.33.

Access aperture 58 permits manipulation of optical fibers during connector assembly. A tool, for example, a tweezers, pick, finger, etc., may be applied through the access aperture 58, utilizing a distance, delta ($\Delta$), to guide, correct, push, or otherwise manipulate the ribbon 18 as it is inserted through the crimp body 50. Delta is defined as a working distance on each side of ribbon 18 for manipulating ribbon 18 during installation. Ribbon 18 has a nominal ribbon width (W). In the embodiment illustrated, d3 equals about half of d1, and d4 equals about half of the ribbon width. Delta may be quantitatively defined as the difference between d3 and d4, thus ½(d1)=d3, ½(W)=d4, and d3−d4=$\Delta$. The $\Delta$ may be from about 0.0 mm to about 3.0 mm. In exemplary embodiments, $\Delta$ may be from about 0.5 mm to about 1.0 mm.

Crimp body 50 may be made from, for example, a UV stabilized, glass filled polyetherimide thermoplastic having a Rockwell hardness value from about 100 to about 120, such as ULTEM 2210, available from Saudi Basic Industries Corporation (SABIC) Innovative Plastics, Houston, Tex. However, other suitable materials may also be used. For example, stainless steel or other suitable metals or plastics may be used.

In an exemplary embodiment, steps for assembling connector sub-assembly 30 may include axially assembling ferrule assembly 60 and securing ferrule assembly 60 to an end of crimp body 50 by placing inner housing 70 about ferrule assembly 60 and attaching inner housing 70 to crimp body 50. Upon assembly of connector sub-assembly 30, but prior to installation of the insert 40, 40a, an adhesive such as an epoxy resin may be introduced into the rear of ferrule 68. A syringe or some other similar adhesive delivery system may be used to enter the receiving area 52 and axially traverse the length of crimp body 50 and into ferrule assembly 60. A controlled amount of adhesive may be placed within the rear of ferrule 78. After the adhesive is placed, the delivery system is removed from crimp body 50 and insert 40, 40a may be installed within the receiving area 52. In an exemplary embodiment, insert 40 is inserted into insert receiving area 56.

Figure 12:
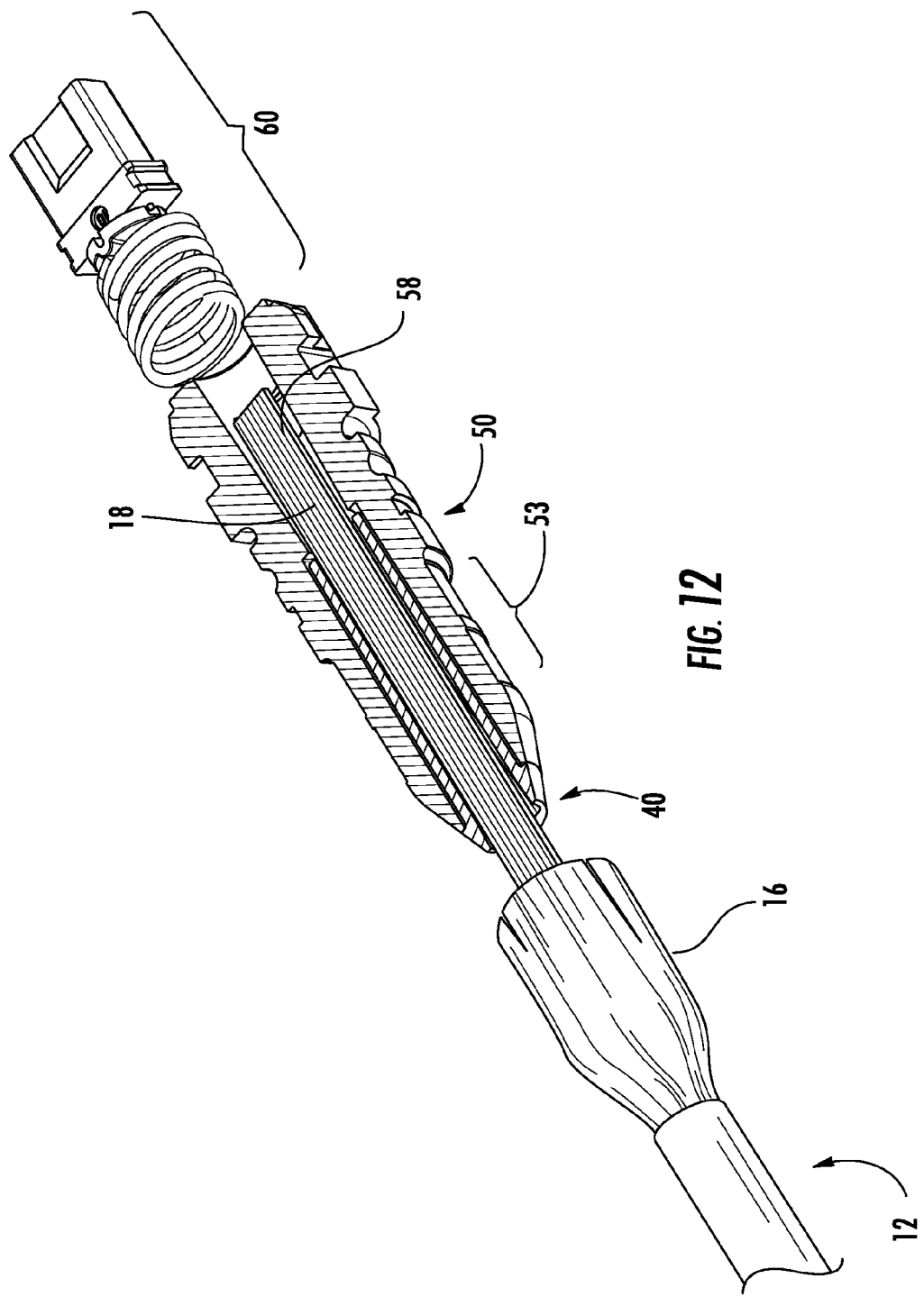
FIG. 12 is a partially cross sectioned detail of part of the connector sub-assembly receiving an array of optical fibers through the optical fiber guide insert.

After installation of an insert 40, 40a, ribbon 18 is inserted through insert 40, 40a and into crimp body 50 (FIG. 12). For clarity, inner housing 70 is not visible. Access aperture 58 presents an opportunity to manipulate the ribbon 18 to ensure proper propagation of the fibers through crimp body 50, and into ferrule assembly 30. Once the ribbon 18 is properly seated in ferrule 68, ribbon 18 may be secured in place using such a curing method as ultraviolet light or laser tacking and the ferrule processed, for example, polished.

Figure 13:
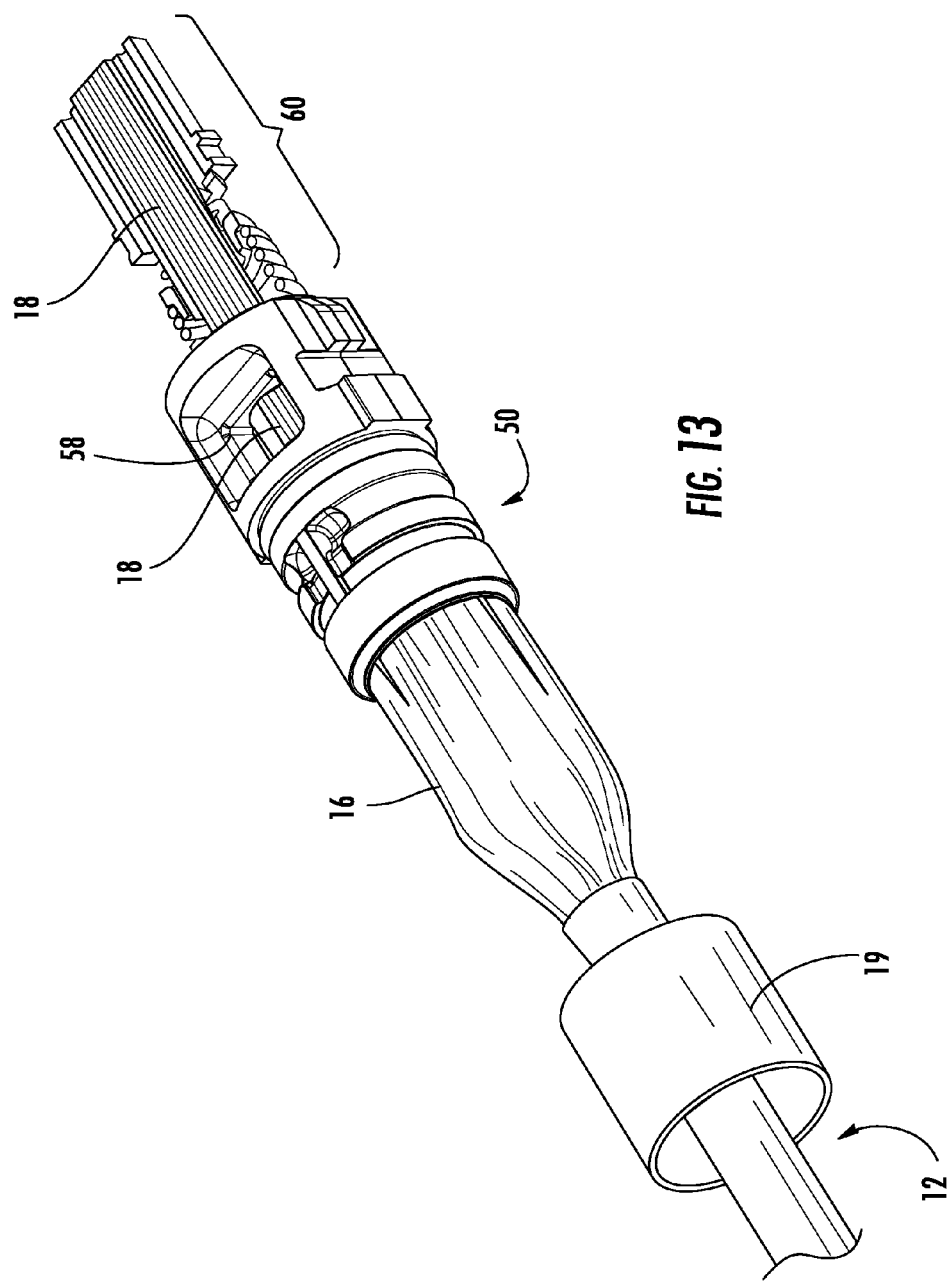
FIG. 13 is a partially cross sectioned detail of the connector sub-assembly n in FIG. 12 with part of the cable about part of the crimp body and the sleeve positioned about the cable.
Figure 14:
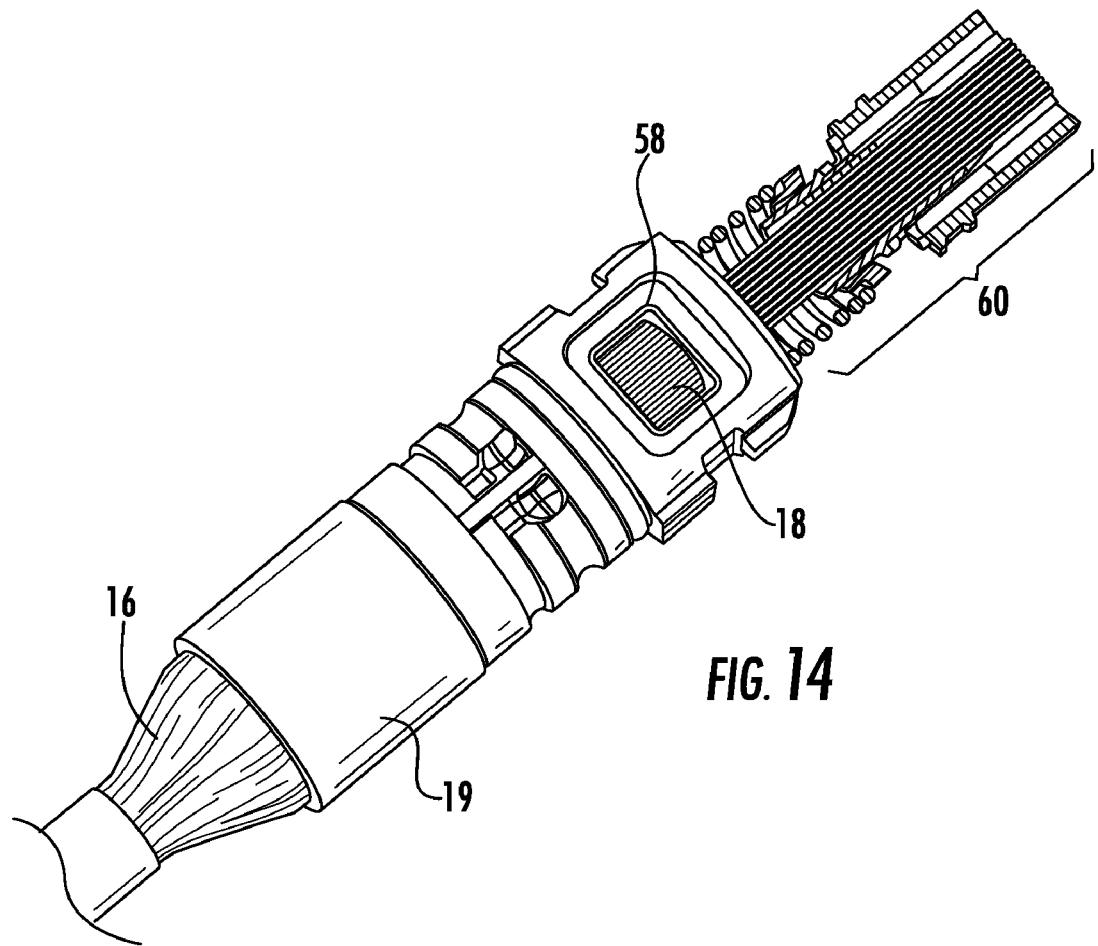
FIG. 14 is a partially cross sectioned detail of the connector sub-assembly of FIG. 12 with part of the cable surrounding part of the crimp body, and the sleeve positioned about both part of the cable and part of the crimp body.

Strength element 16 may be placed about crimp zone 53 (FIG. 13). Sleeve 19, having been previously threaded onto cable 12, may be axially moved along cable 12 until it is in place about both strength element 16 and crimp zone 53 (FIG. 14). Once sleeve 19 is in place the connector sub-assembly 30 may be placed onto a tool for crimping.

In yet another exemplary embodiment, steps for assembling connector sub assembly 30 may include a free assembly. The free assembly may include, but is not limited to, inserting insert 40, 40a into crimp body 50, threading ribbon 18 through insert 40, 40a and crimp body 50, exposing a length of ribbon 18. Strength element 16 may be placed about crimp zone 53 and sleeve 19 axially moved along cable 12 until it is about both strength element 16 and crimp zone 53, and crimped in place. In other words, ribbon 18 protrudes from crimp body 50 and strength element 16 is substantially crimped to crimp zone 53 before ferrule assembly 60 or inner housing 70 is installed. A tool, for example, a tweezers fitted with a pair of elastomeric pads having a Shore A hardness value of at least from about 60 to about 90, for example, silicone pads or rubber pads, may be fitted into access aperture 50. A sufficient compressive force may be applied to the tool to lock ribbon 18 between the elastomeric pads, enabling processing, for example, stripping, cutting, etc., of ribbon 18 prior to installing ferrule assembly 60 and inner housing 70. Locking ribbon 18 during installation of ferrule assembly 60 and inner housing 70 generally stabilizes ribbon 18 and substantially inhibits one or more of either: axial buckling of ribbon 18 during handling and ribbon processing; withdrawal of ribbon 18 into cable 12 during handling and ribbon processing; or pushing out of further amounts of ribbon 18 from cable 12 during handling and processing. Ferrule assembly 60 may be installed as an assembly, or each component 62, 64, 66, and 68 may be installed individually.

A crimp die 80 may be used to crimp sleeve 19 about strength element 16 and crimp body 50 (FIGS. 15-17) Crimp die 80 has at least one indentation surface 82, at least one rib relief 84, at least one lower ridge relief 86, at least one upper ridge relief 87, and at least one flare relief 88. In exemplary embodiments, crimp die 80 may have four indentation surfaces. In exemplary embodiments, rib relief 84 is located in a longitudinal space between two indentation surfaces 84. In exemplary embodiments, lower ridge relief 86 is located in an arcuate feature of crimp die 80. When two crimp dies 80 are placed together such that the lower ridge relief areas 86 on the respective dies 80 are adjacent, the arcuate features complement each other to define an orifice for crimping sleeve 19 into crimp band 20. Crimp die 80 may be made from hard metal, for example, tool steel, or a ceramic, for example, a carbide, though other materials are possible. Crimp dies 80 are affixed to a tool designed to apply a force to bring the two dies 80 together. Two tools suitable to receive crimp die 80 may be a manual crimping tool 90 (FIG. 16), or, for example, a power crimp tool 100 (FIG. 17), available from Schleuniger Inc, Manchester, N.H., though other tools are possible.

During a crimping operation, indentation surface 82 may encounter sleeve 19. Under a compressive load, sleeve 19 may be deformed from opposing sides at the same time. The at least one indentation surface 82 presses the material of sleeve 19 down onto the strength element 16 and into the compression area 54. Material not captured by indentation surfaces 82, for example, that material underneath rib relief 84, lower ridge relief 86, upper ridge relief 87, and flare relief 88 may or may not compress, but rather may be left in relief (FIG. 18).

After the crimping operation (FIGS. 18-19), crimp band 20 may include at least one flare 22 defining at least one flare interior 23, at least two indentations 24, defining at least two compression surfaces 25, positioned longitudinally on an outer surface of crimp band 20 and separated by a distance. The distance may be from about 1.0 mm to about 2.2 mm. In an exemplary embodiment, the distance may be from about 1.75 mm to about 1.95 mm. In further exemplary embodiments the distance is about 1.85 mm. Rib 26, defining at least one rib interior 27, may be located within at least part of the distance. At least one ridge 28, defining at least one ridge interior 29, may be on the outer surface of crimp band 20. Exemplary embodiments include at least four indentations 24. In alternate embodiments, a distance may exist between additional pairs of longitudinally adjacent indentations, wherein a rib similar to rib 26 may be formed. In exemplary embodiments, two or four pairs of diametrically opposed indentations 24 may be present.

Figure 18:
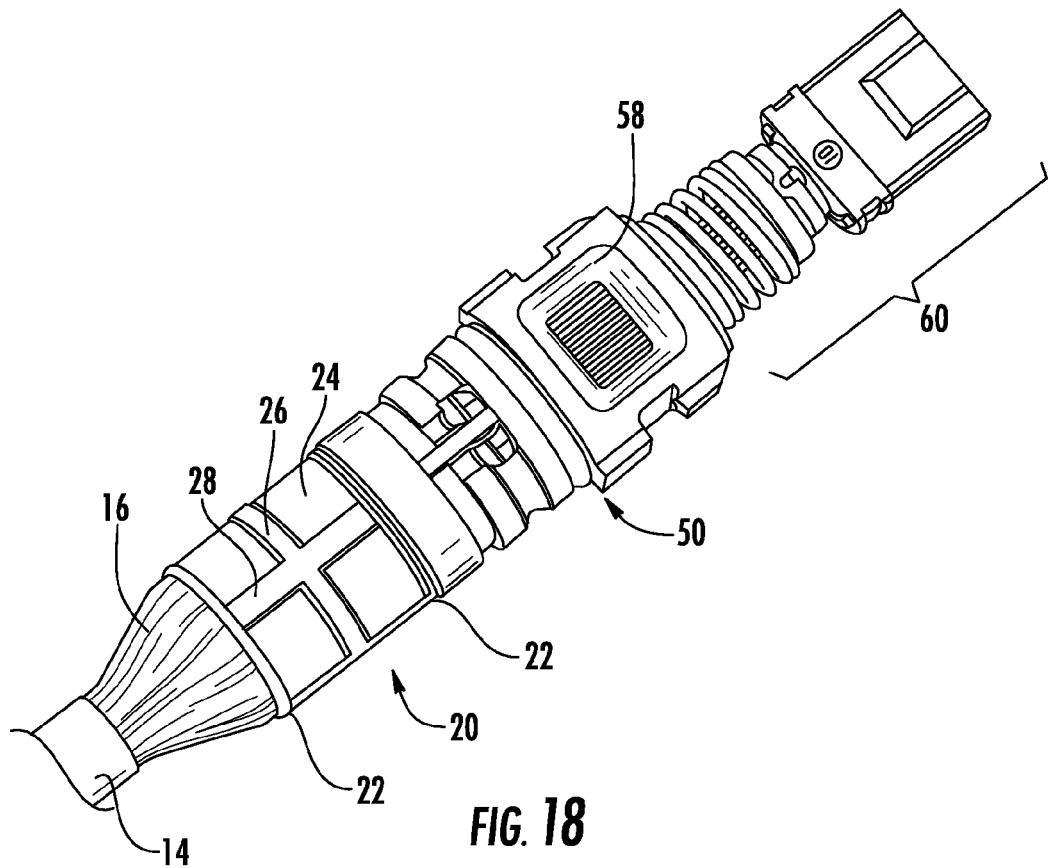
FIG. 18 is the connector sub-assembly of FIG. 12 having a crimp band formed by the crimp die of FIG. 15.
Figure 19:
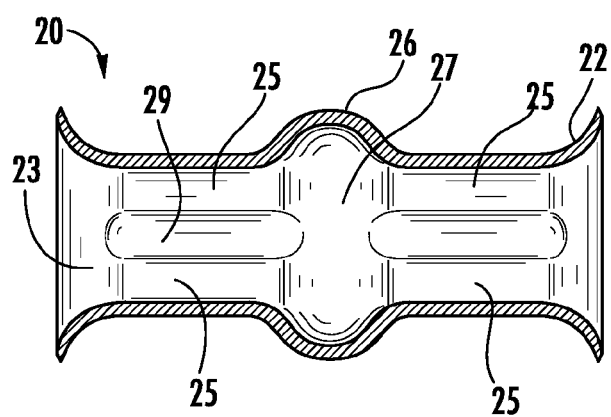
FIG. 19 is a side cross section of the crimp band n in FIG. 18.
Figure 20:
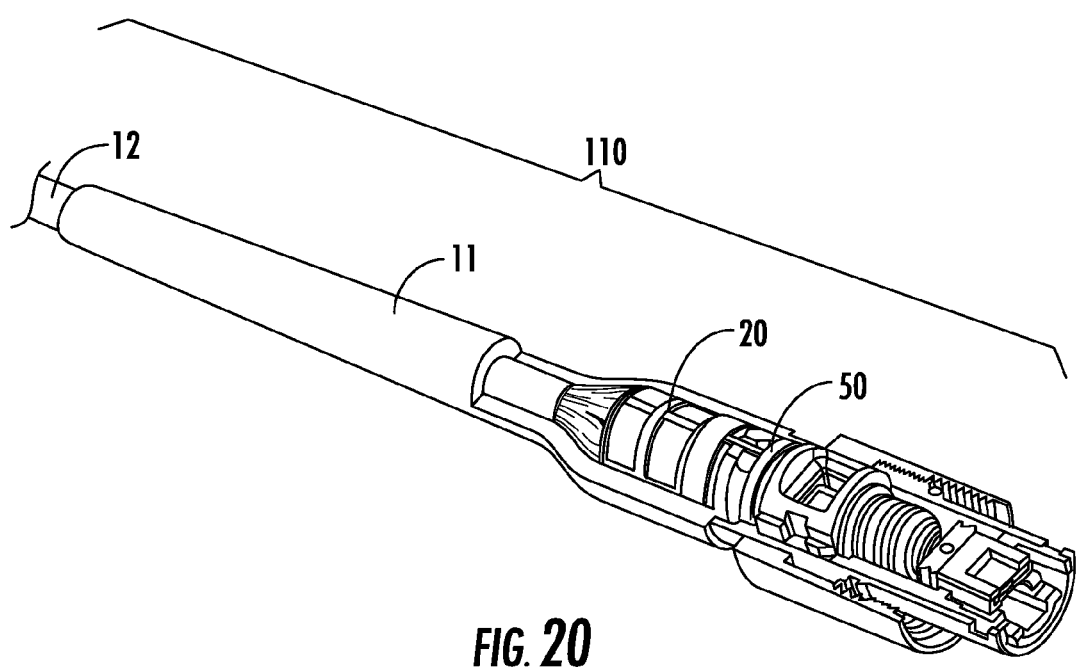
FIG. 20 is a in partial cross section of a fiber optic connector having the connector sub-assembly of FIG. 18.

Fiber optic cable assembly 110 (FIG. 20) may include crimped connector sub-assembly 30 (FIG. 18). Boot 11 may be placed about the cable 12 and the connector sub-assembly 30. Crimp band 20 is substantially mechanically interlocked with crimp body 50, trapping strength element 16. A cross sectional detail of crimp band 20, strength element 16 and crimp body 50, highlights the relationship of features of the crimp body 50 and the crimp band 20 (FIG. 21). By way of explanation, a cable pull off force, represented by force vector 112, is applied to the strength element 16.

When tension is placed on fibrous strength element 16, features of the crimp band 20 act to prevent breakage and/or pullout. Flares 22 provide a gradual transition from a compressed state to a free state to the strength element 16. Compression surfaces 25 pressing into compression areas 54 provide the greatest amount of initial compressive force to the strength element 16. In the event that some slippage occurs, usually from about 850 Newtons (N) to about 890 N, the crimp band 20 will translate axially in the direction of the tensile force vector 112, encountering hoop 56 mechanically interlocked to rib 24. Crimp band 20 will stop translating at this point. The fibers of strength element 16 will bunch within internal channel 25 under rib 24, increasing the amount of cable pull off force that may be endured. Any further slippage is prevented by redirecting the force represented by force vector 112, pushing outward on the interior of crimp band 20, causing an outward deflection of the crimp band 20 as the force increases. The redirection of force creates a compressive counter-force, represented by force vectors 114, concentrating the compressive force at point 112, just prior to crimp band 20 deflecting sufficiently to slip over hoop 56 or breakage of the strength element 16 (FIG. 22).

Results of an exemplary test using a conceptual mock-up of crimp body 50 having crimp band 20 applied are described. The conceptual mock-up was a solid, lathe turned test sample of ULTEM 1000, a non-glass filled thermoset polymer, having the geometry of the crimp zone 53 of crimp body 50. The minimum requirement of the test was for the crimp body 50 and the crimp band 20 to resist a cable pull off force of about 445 N (about 100 pounds-force (lbf)). The test objective was for the crimp body 50 and the crimp band 20 to resist a cable pull off force of about 667 N (about 150 lbf). The individual forces at failure from the test were from about 1000 N to about 1200 N (about 225 lbf to about 270 lbf). The average failure force was from about 1068 N to about 1112 N (about 240 lbf and about 250 lbf). An exemplary test using a conceptual mock-up of the crimp body 50 resulted in an average failure force of about 1082 N (about 243 lbf).

Another exemplary test using crimp bodies 50 made from, for example, ULTEM 2210, exceeded a cable pull off force of about 667 N. The cable pull off forces resulting from the test were from about 890 N to about 1780 N (about 200 lbf to about 400 lbf). The individual forces at failure were observed to be about 1179 N to about 1223 N (about 265 lbf to about 275 lbf).

Yet another exemplary test resulted in an average force at failure of about 1209 Newtons (about 272 lbf).

Results as disclosed may provide that crimp band 20 cooperating with crimp body 50 enables utilization of such less expensive fibrous strength elements as fiberglass instead of such expensive materials as aramid yarns or glass reinforced plastics.

Crimp zone 53 may be scaled to accommodate any cable of any diameter that has a fibrous strength element. Furthermore, crimp zone 53 may be adapted to transfer a rated yield strength of any suitable cable to any body having crimp zone 53, for example, creating a transition from cable to crimp body that may have a similarly rated yield strength. For example, cables having yield ratings from about 890 N to about 2670 N (about 200 lbf to about 600 lbf) may be secured to suitable housings having suitably scaled crimp zones 53, using suitably scaled crimp bands 20. The yield strength of the cable may be effectively transferred into the housing, resulting in a cable to junction that may be as resistant to a pull force as the original cable.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the disclosed fiber optic connector clip. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A fiber optic connector assembly, comprising:
 a fiber optic cable, the fiber optic cable having at least one optical fiber ribbon;
 a fiber optic connector, the connector comprising;
  at least one optical fiber ferrule assembly;
  a crimp body, the crimp body defining a through passage, and a fiber access aperture having at least two walls defining a first width and a second width, wherein the fiber access aperture defines a predetermined delta and a predetermined aspect ratio providing optical fiber ribbon access for alignment of the optical fiber ribbon to the optical fiber ferrule assembly, the delta being defined as a distance on each side of the optical fiber ribbon between one of the at least two walls and the optical fiber ribbon, wherein the delta is from about 0.0 mm to about 3.0 mm; and
 a crimp band for holding a fiber optic cable to the fiber optic connector.

2. The connector assembly of claim 1, wherein the delta is from about 0.5 mm to about 1.0 mm.

3. The connector assembly of claim 1, the aspect ratio being defined as a ratio of the first width to the second width.

4. The connector assembly of claim 3, the fiber access aperture having an aspect ratio from about 0.5 to about 1.4.

5. The connector assembly of claim 3, the fiber access aperture having an aspect ratio of about 1.33.

6. The connector assembly of claim 1, the connector assembly further including a fiber guide insert, wherein the fiber guide insert defines a tapered passage therethrough.

7. The connector assembly of claim 6, the crimp body further defining an insert receiving area at the second end.

8. A crimp body for a fiber optic connector, the crimp body comprising:
 a first end and a second end and a passage therethrough;
 a fiber access aperture adjacent to the first end, generally perpendicular to the passage, the fiber access aperture having a first width and a second width, wherein the fiber access aperture defines an aspect ratio, the aspect ratio being defined as a ratio of the first width to the second width, the aspect ratio being from about 0.5 to about 1.4;
 an insert receiving area at the second end.

9. The connector assembly of claim 8, the fiber access aperture having an aspect ratio of about 1.33.

10. A method of assembling a fiber optic cable assembly, comprising:
 providing a fiber optic cable having at least one optical fiber;
 providing a fiber optic connector assembly, the connector assembly including a crimp body defining a first end and a second end and a passage therethrough, the crimp body further defining a fiber access aperture, and at least one ferrule near the first end of the crimp body;
 preparing the at least one optical fiber for insertion into the connector assembly;
 introducing an adhesive into the second end of the crimp body assembly;
 inserting the at least one optical fiber into the second end of the connector assembly;
 observing the at least one optical fiber through the fiber access aperture;
 manipulating the at least one optical fiber through the fiber access aperture; and
 securing the optical fiber to the ferrule.

11. The method of claim 10, including the step of providing a fiber guide insert to insert into the crimp body.

12. The method of claim 10, including the step of providing a crimp band to secure the cable to the crimp body.

13. The method of claim 12, including the step of crimping the crimp band.

14. A fiber optic connector assembly, comprising:
 a fiber optic cable, the fiber optic cable having at least one optical fiber ribbon;
 a fiber optic connector, the connector comprising;
 at least one optical fiber ferrule assembly;
 a crimp body, the crimp body defining a through passage, and a fiber access aperture having at least two walls defining a first width and a second width, wherein the fiber access aperture defines a predetermined delta and a predetermined aspect ratio providing optical fiber ribbon access for alignment of the optical fiber ribbon to the optical fiber fenule assembly, the delta being defined as a distance on each side of the optical fiber ribbon between one of the at least two walls and the optical fiber ribbon, the delta being about 0.5 mm to about 1.0 mm; and
 a crimp band for holding a fiber optic cable to the fiber optic connector.

15. The connector assembly of claim 14, the aspect ratio being defined as a ratio of the first width to the second width.

16. The connector assembly of claim 15, the fiber access aperture having an aspect ratio from about 0.5 to about 1.4.

17. The connector assembly of claim 15, the fiber access aperture having an aspect ratio of about 1.33.

18. The connector assembly of claim 14, the connector assembly further including a fiber guide insert, wherein the fiber guide insert defines a tapered passage therethrough.

19. The connector assembly of claim 18, the crimp body further defining an insert receiving area at the second end.

20. A fiber optic connector assembly, comprising:
 a fiber optic cable, the fiber optic cable having at least one optical fiber ribbon;
 a fiber optic connector, the connector comprising;
 at least one optical fiber ferrule assembly;
 a crimp body, the crimp body defining a through passage, and a fiber access aperture having at least two walls defining a first width and a second width, wherein the fiber access aperture defines a predetermined delta and a predetermined aspect ratio providing optical fiber ribbon access for alignment of the optical fiber ribbon to the optical fiber ferrule assembly, the aspect ratio being defined as a ratio of the first width to the second width, the fiber access aperture having an aspect ratio from about 0.5 to about 1.4; and
 a crimp band for holding a fiber optic cable to the fiber optic connector.

21. The connector assembly of claim 20, the delta being defined as a distance on each side of the optical fiber ribbon between one of the at least two walls and the optical fiber ribbon.

22. The connector assembly of claim 21, wherein the delta is from about 0.0 mm to about 3.0 mm.

23. The connector assembly of claim 21, wherein the delta is from about 0.5 mm to about 1.0 mm.

24. The connector assembly of claim 20, the fiber access aperture having an aspect ratio of about 1.33.

25. The connector assembly of claim 20, the connector assembly further including a fiber guide insert, wherein the fiber guide insert defines a tapered passage therethrough.

26. The connector assembly of claim 25, the crimp body further defining an insert receiving area at the second end.

27. A fiber optic connector assembly, comprising:
 a fiber optic cable, the fiber optic cable having at least one optical fiber ribbon;
 a fiber optic connector, the connector comprising;
 at least one optical fiber ferrule assembly;
 a crimp body, the crimp body defining a through passage, and a fiber access aperture having at least two walls defining a first width and a second width, wherein the fiber access aperture defines a predetermined delta and a predetermined aspect ratio providing optical fiber ribbon access for alignment of the optical fiber ribbon to the optical fiber ferrule assembly, the aspect ratio being defined as a ratio of the first width to the second width, the fiber access aperture having an aspect ratio of about 1.33; and
 a crimp band for holding a fiber optic cable to the fiber optic connector.

28. The connector assembly of claim 27, the delta being defined as a distance on each side of the optical fiber ribbon between one of the at least two walls and the optical fiber ribbon.

29. The connector assembly of claim 28, wherein the delta is from about 0.0 mm to about 3.0 mm.

30. The connector assembly of claim 28, wherein the delta is from about 0.5 mm to about 1.0 mm.

31. The connector assembly of claim 27, the connector assembly further including a fiber guide insert, wherein the fiber guide insert defines a tapered passage therethrough.

32. The connector assembly of claim 31, the crimp body further defining an insert receiving area at the second end.

33. A crimp body for a fiber optic connector, the crimp body comprising:

a first end and a second end and a passage therethrough;

a fiber access aperture adjacent to the first end, generally perpendicular to the passage, the fiber access aperture having a first width and a second width, wherein the fiber access aperture defines an aspect ratio, the aspect ratio being defined as a ratio of the first width to the second width, the fiber access aperture having an aspect ratio of about 1.33;

an insert receiving area at the second end.

* * * * *